May 5, 1931.　　　E. R. GREENLEE　　　1,803,798
AIR BRAKE
Filed June 24, 1929　　　3 Sheets-Sheet 2
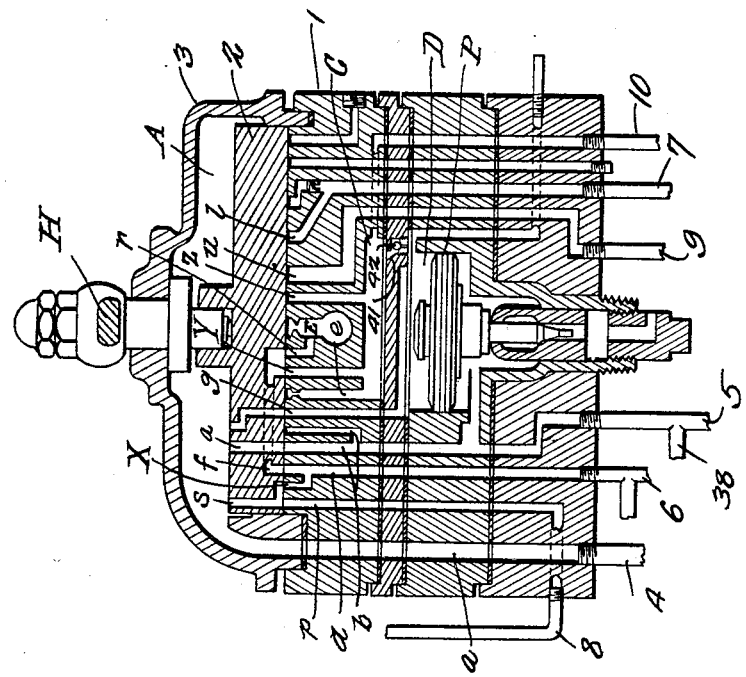
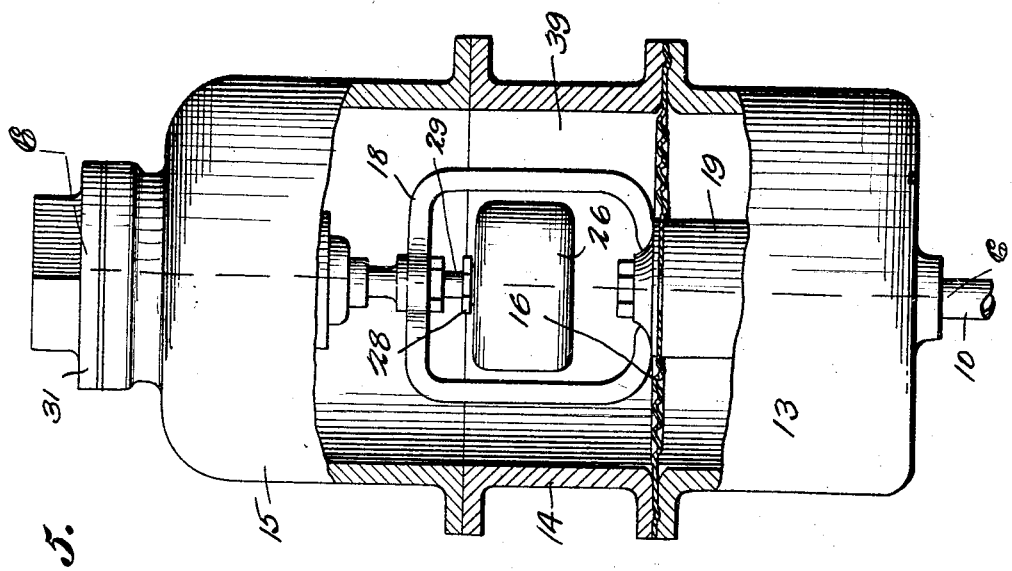
E. R. Greenlee
Inventor
By C. A. Snow & Co.
Attorneys.

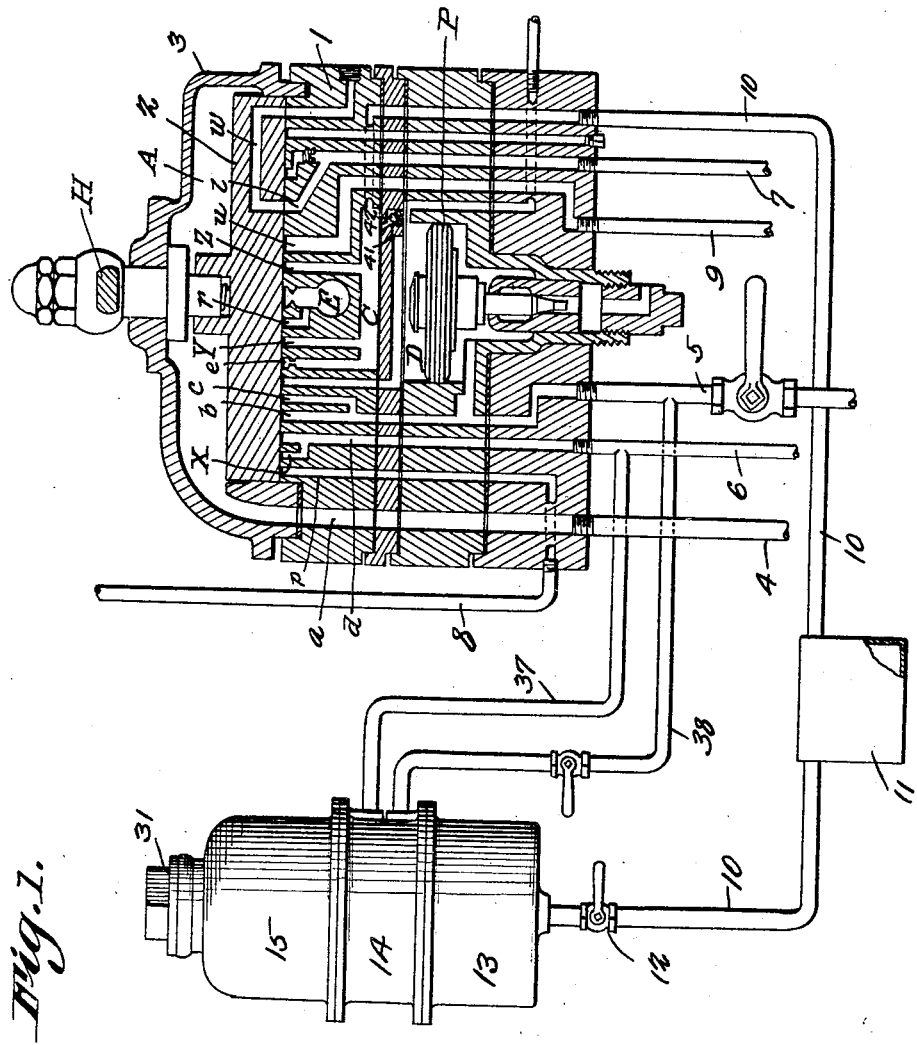

May 5, 1931.  E. R. GREENLEE  1,803,798
AIR BRAKE
Filed June 24, 1929   3 Sheets-Sheet 3
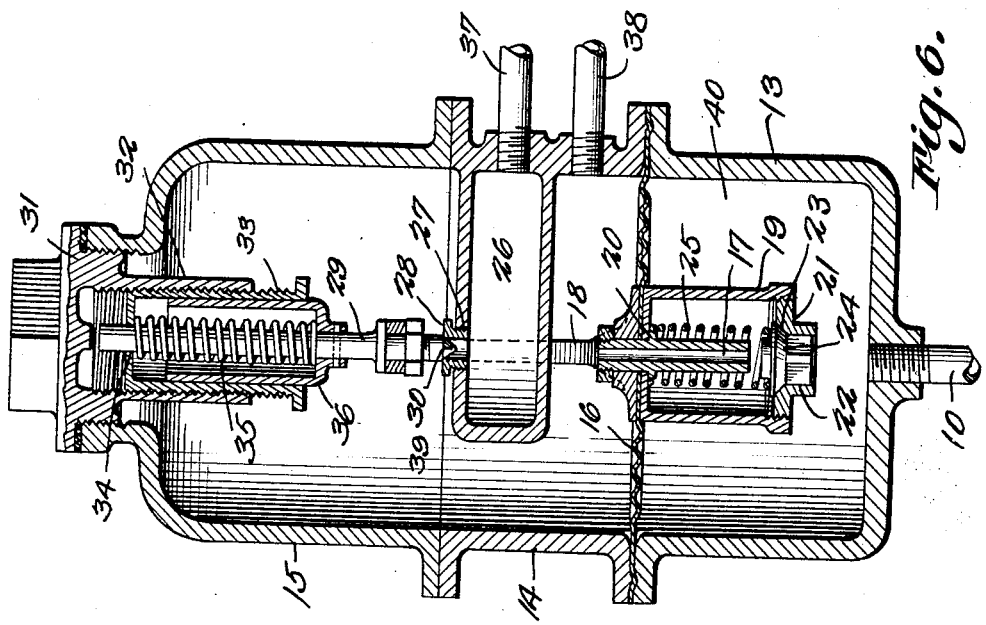
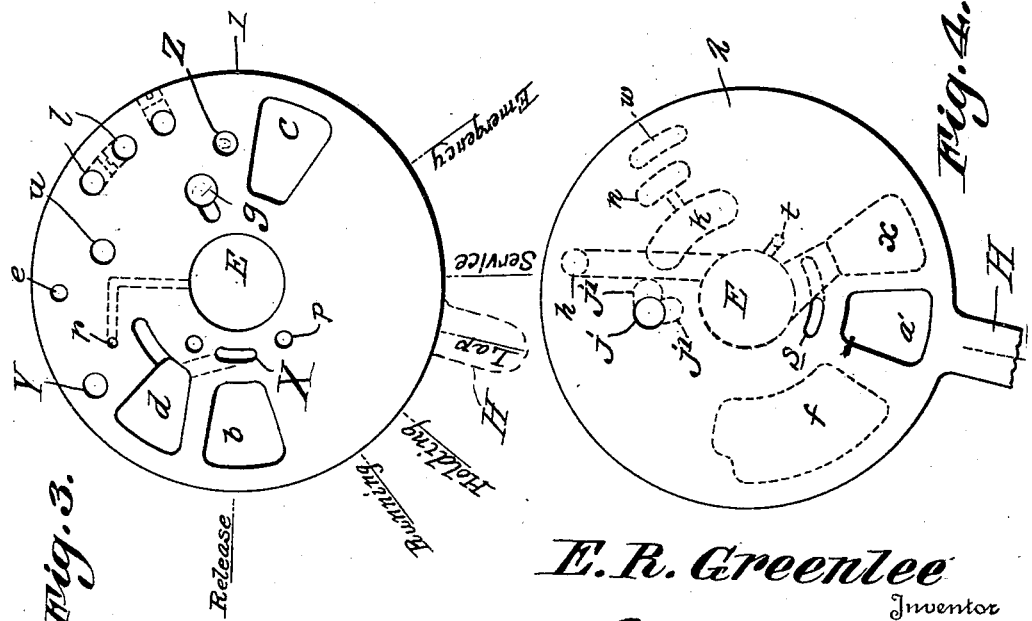
E. R. Greenlee
Inventor
By C. A. Snow & Co.
Attorneys.

Patented May 5, 1931

1,803,798

UNITED STATES PATENT OFFICE

ELBERT R. GREENLEE, OF KANSAS CITY, KANSAS

AIR BRAKE

Application filed June 24, 1929. Serial No. 373,340.

This invention relates to air brakes such as used in connection with railway locomotives.

As is well-known to those skilled in the art the worst factor with which a locomotive engineer has to contend is brake pipe leakage. Where the leakage is slight, the engineer can operate the brake with fair success but the chances of proper actuation are reduced as the rate of leakage increases. Where there are bad leaks the engineer has no control over the amount of brake pipe reduction in making a service application, other than the initial reduction for when the valve is placed on lap, the leakage continues reducing the brake pipe pressure and, as a result, a harder and frequently a quicker application of the brake is produced than desired. This application sometimes causes severe shock, damage to equipment and even personal injury with resultant delays and expense.

As leakage cannot be eliminated, it is an object of the present invention to provide an automatically regulated auxiliary feed valve and an improved brake valve for eliminating the effect of leakage.

It is another object of the invention to provide a means whereby it is possible for the engineer to make any desired reduction and at the same time prevent any further reduction by leakage. Thus it is possible to make a light initial application of the brake and thereafter add to the holding power of the brake by making further light reductions when it is apparently safe to do so. Consequently, by starting the reduction far enough back from the objective stopping, the engineer is able to bring a long train to a stop without shock or other damage.

It is the practice of some engineers to lap the brake valve and permit the leakage to apply the brake. Other engineers hesitate long enough on the lap, in moving the handle from running to service positions, to permit leakage to start triple pistons toward service position. Both these practices are bad and frequently cause undesired quick action. It is an object of the present invention to provide a means whereby both of these objectionable practices will be eliminated because leakage cannot set the brake while the valve is on lap.

A further object is to provide a means which not only saves time and expense through the elimination of heavy shocks but permits smoother handling of long trains, saves unnecessary wear and tear on the draft and brake rigging, and allows the engineer to exercise his own judgment in making service applications as to the amount of reduction required to produce the necessary holding power of the brakes, and the complaint that poor starting and stopping is due to the brake pipe leakage, will no longer be tolerated.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a view partly in elevation and partly in section of that portion of an air brake system constituting the present invention, the section through the rotary valve and its seat being in diagram to more clearly illustrate the relative positions of the several ports, chambers, etc., the valve being shown in lap position.

Figure 2 is another diagrammatical sectional view through the valve and seat, the parts being in release position.

Figure 3 is a plan view of the seat of the rotary valve.

Figure 4 is a plan view of the rotary valve.

Figure 5 is a view partly in elevation and partly in section of the equalizer.

Figure 6 is a section on line 6—6, Figure 5.

The rotary valve and seat illustrated in diagram in Figures 1 and 2 is of the type known generally as the Westinghouse H-6 automatic brake valve. This valve includes the seat 1 and the rotary element 2. This rotary element or valve per se is contained in a cap 3 in which is located an air chamber A which communicates through a port $a$ with the main reservoir pipe 4. In the seat 1 are located a number of recesses and ports. For example ports $b$ and $c$ lead to the brake pipe 5; port $d$ leads to a pipe 6 extending to the usual feed valve; port $e$, which is the preliminary exhaust port, leads to a chamber C; and port $g$ leads to chamber D. Another port $l$ leads to the release pipe of the distributing valve, this pipe being shown at 7 while another port $p$ communicates with the governor low pressure operating pipe 8. A warning port $r$ opens to the exhaust E and another port $u$ leads to a pipe 9 extending to the application cylinder.

The ports thus far described are those found in the standard rotary valve seat of the type mentioned. In addition thereto and for the purpose of the present invention there are provided a port X communicating with the feed valve, a port Y extending to chamber C and a port Z extending to chamber C. This supplemental chamber C is a new feature and is used in addition to the piston chamber D commonly employed.

Most ports and cavities in the rotary valve 2 are the same as those in the standard type of valve and have been shown in Figure 4, these ports and cavities cooperating with the ports in the seat to produce the desired operation when the valve is shifted to any one of its several positions. Referring to Figure 4 there has been indicated at $a'$ the port through the valve which registers with the brake pipe when in release position. At $f$ there is shown a cavity in the face of the valve which connects the feed valve to the brake pipe in running and holding position, and the feed valve to the warning port in release position. At $h$ there is shown a port in the face of the valve connecting with the exhaust cavity E. Other ports $j$ and $s$ extend through the rotary valve 2 and in addition thereto there are provided the usual cavities $k$, $n$, $w$, $t$, and $x$. These are all provided for the well-known purposes and a detailed explanation thereof is not deemed necessary as it is believed that those skilled in the art to which this invention relates will have full knowledge thereof.

In carrying out the present invention there are provided some supplemental parts. These include a pipe 10 that leads from the chamber C to a supplementary reservoir 11 and from this reservoir the pipe leads through a valve 12 into the bottom of the casing of an automatically regulated auxiliary feed valve.

As shown particularly in Figure 6 the casing of the auxiliary feed valve is formed preferably of a lower section 13, an intermediate section 14 and an upper section 15. The marginal portion of a diaphragm 16 is gripped between the sections 13 and 14 and extending through the center of this diaphragm is a tube 17 one end portion of which is screwed or otherwise secured in a yoke 18 located in the section 14 of the casing. The other end of the tube is suspended within a valve casing 19 held firmly against the bottom of the diaphragm 16 by a collar 20 on the tube 17. The lower end of casing 19 is closed by a plug 21 having an opening therethrough as shown at 22, the upper portion of the wall of this opening providing a valve seat 23. A valve 24 normally engages this seat so as to close the opening 22, said valve being held yieldingly in position by a spring 25 mounted on the tube 17.

The tube 17, casing 19, and opening 22 provide an emergency by-pass for the purpose hereinafter explained.

Extending inwardly from the intermediate section 14 of the casing is a supply chamber 26 having an opening 27 in the top thereof in which is arranged an adjustable valve seat 28. The yoke 18 extends around the chamber 26 and has a stem 29 secured to the upper portion thereof, the lower portion of this stem being tapered as at 30 to constitute a valve for closing against the seat 28.

A screw plug 31 serves to close the upper end of the section 15 and depending from this plug is an interiorly screw threaded sleeve 32.

Adjustably mounted in the sleeve 32 is a screw-threaded box 33 the upper end of which is closed except for a small opening 34 through which one end portion of the stem 29 is adapted to project. This closed end of the box also constitutes an abutment for the coiled spring 35 the other end of which bears against a tubular guide member 36 which is secured to stem 29 and slides freely within the box 33. Obviously by rotating the box 33 so as to adjust it longitudinally of the sleeve 32 the compression of the spring 35 can be varied.

The supply pipe 6 forming a part of the standard air brake equipment is connected through a pipe 37 with the chamber 26 while pipe 5 of the system is connected by a discharge pipe 38 to the equalizing chamber 39 formed around chamber 26 and within the casing sections 14 and 15. This equalizing chamber, which contains brake pipe pressure, is located entirely at one side of the diaphragm. At the other side of the diaphragm and within the casing section 13 is located the control chamber 40 containing the same pressure as that in chamber C.

For the purpose of effecting the proper operation of the mechanism constituting the invention the valve seat 1 has been provided with the supplemental chamber C connected by a port 41 with the chamber D, this port being provided with a check valve 42 as shown. By providing this check valve in port 41 air is permitted to flow from chamber D to chamber C whenever the pressure in chamber D is greater than that in chamber C. This check valve, however, will not permit a back-flow of air from the chamber C to chamber D.

The modified valve seat structure also differs from the standard form in that the port e opens into the chamber C instead of into chamber D. The valve 2 differs from the standard valve of the type mentioned solely in the slight enlargement of the port s.

Referring back to the auxiliary feed valve shown in Figures 5 and 6 it will be understood that when pressure in the control chamber 40 rises above that in the equalizing chamber 39, the diaphragm 16 will elevate the yoke 18 and cause the supply valve 30 to move against the action of its spring 35 so as to open the port in the top of the supply chamber 26. This admits pressure from the feed pipe and supply chamber 26 to the equalizing chamber 39 until the pressures are equalized and the diaphragm 16 returns the yoke and the valve 30 to their lower or normal positions. When pressure in the control chamber 40 becomes greater than that in the equalizing chamber 39 to an excessive extent requiring an emergency release of pressure, valve 23 will become unseated against the action of the spring 25.

With the locomotive brake equipment now in use, there is provided in the brake valve means whereby the brake pipe may be quickly charged or recharged by moving the handle to release position, but if held there long enough the brake pipe would equalize with main reservoir pressure, which is undesirable. In order to provide for leakage from brake pipe and to automatically prevent brake pipe from charging to too high a pressure there is provided a spring-regulated feed valve of reducing valve (not shown), which will close when brake pipe pressure reaches the adjustment of the regulating spring. This feed valve performs this function of controlling brake pipe pressure while the brake valve is in running and holding positions but is cut out by the rotary valve in all other positions.

The automatic brake systems on engines and trains are first charged with compressed air, which passes through the automatic brake valve and into the brake pipe, the air necessary to operate the brakes being stored on each car and engine in the train. After the system is charged, any material reduction of brake pipe pressure will apply the brakes, regardless of what causes the reduction. The greater the reduction the harder the brakes will apply, until about two-sevenths of the original pressure has been drawn from brake pipe (freight equipment) after which any further reduction will only make it more difficult to release the brakes, as this further reduction would have to be first restored before any effect is felt at the triple valves.

If the reduction is made at the brake valve by moving handle to service and, after drawing from piston chamber D six or eight pounds pressure, the handle is then placed on lap, there would be obtained what is known as a light service application of the brakes, and should there be no leakage from brake pipe, the braking power secured by this application would remain the same, but when leakage is present, the brakes will continue to apply harder as long as valve is left on lap, until full equalization takes place, and then to reduce brake pipe pressure below a full service reduction, which is undesirable except in emergency applications, when all air is exhausted from the brake pipe.

Leaks are always present and their effects are very detrimental to successful train handling. With short trains leakage may be reduced to a point where it will not seriously interfere with the proper operation of the brakes, but with a train of 100 or more cars, as is today a common thing, to reduce leakage to this point is a different matter and even though it is brought within the requirements of the standing, terminal test required by law, leakage often develops while the train is on the road. This may not be discovered until a service application is made and then too late to avoid trouble and damage, which may and often does result as a direct effect of brake pipe leakage. Were it possible to maintain a brake pipe with no leakage, it would also be possible to do a perfect job of braking, and the fact that the first is practically impossible prevents the accomplishment of the latter.

Recognizing these facts the present invention has been evolved to automatically take care of brake pipe leakage when the brake valve is in lap position, and this regardless of whether a service reduction has been made or not.

The effect of this invention is to cut in the regular feed valve while brake valve is on lap whenever leakage reduces the brake pipe a little below what it should and would register were leakage not present, and to cut it out again when proper pressure is restored.

The auxiliary feed valve shown in Figures 5 and 6 will remain closed and keep the regular feed valve cut off from brake pipe in lap position as long as there is no reduction of brake pipe pressure of more than about one pound below that of supplemental chamber C and control chamber which pressure will be the same as is in piston chamber D at any time when the valve is moved to lap position. As this valve 30 remains closed when pressures in chamber C, chamber D, and the brake pipe are equal, it has been necessary to work out a system that will provide equalization of all these pressures when the valve is in any position, except lap position, and to trap or bottle up air at the right pressure which will act as a control or regulating pressure for the auxiliary feed valve. This has been provided for by adding the ports X. Y, and Z, and by enlarging the ports s and e.

When the handle H of the valve is in release position port $a$ registers with brake pipe, port $j$ with chamber D and port X with chamber C through cavity $f$ of valve 2 and port Y. Since main reservoir pressure is flowing through these three ports, it will, if held in this position long enough, result in equalization of pressure in the brake pipe, chamber D, chamber C and control chamber 40. Pressures will be equal on both sides of diaphragm 16 and supply valve 30 will be closed.

When handle H is moved to running position, chambers D and C are in communication with the brake pipe, being connected by cavities $k$ and $n$ and the port between these cavities. This provides for the desired equalization of the brake pipe, chamber D and chamber C which maintains equalization in the chambers of the auxiliary feed valve.

The relative positions are the same when the handle is moved to lap, as shown in Figure 1, from any position, the pressure then existing in chambers C and D will be trapped in chamber C. The trapping of pressure in chamber C is the foundation of this invention as it is this pressure that automatically controls the feed valve.

In service position port $h$ and its passage in the rotary valve register with the preliminary exhaust port $e$, chamber C and, by way of ball check 42 and connecting passage 41, with chamber D. When pressure in chamber C and the control chamber 40 is slightly reduced, pressure below the check 42 in chamber D will immediately raise the check and be reduced at the same rate as in chamber C. After the desired reduction has been made from these two chambers the handle is moved to lap, trapping air in chamber C at the pressure then existing in both chambers D and C. When the brake pipe reduces to a slightly lower pressure than chamber D, chamber D pressure seats the equalizing piston P and stops the flow of air from the service exhaust port of the valve. It requires a difference of one-third to two-thirds of a pound to seat the equalizing piston and a difference of about one pound to open the supply valve 30 of the auxiliary feed valve. Consequently this valve 30 will remain closed until a further reduction of pressure in the brake pipe, which will assuredly follow, by leakage. When the brake pipe has reached a pressure one pound below that trapped in chamber C and the control chamber 40, the trapped pressure will compress the supply valve spring 35 and force the valve 30 off its seat, thereby connecting the feed valve proper with the brake pipe and this now permits feed pipe pressure to flow directly to the brake pipe in sufficient quantity to supply the leakage therefrom. It cannot raise the brake pipe pressure above what it was at the time the exhaust from service port ceased, which would release the brakes, but is prevented from doing it by the automatic control feature of the auxiliary feed valve which will automatically cut off the supply from feed valve pipe whenever brake pipe pressure reaches a point of less than one pound below the pressure in the control chamber. In this the auxiliary feed valve acts as an automatic cut out cock, and is itself automatically regulated to open and close the supply valve at the right time.

The foregoing describes the action for a single reduction application. The same action takes place for each separate reduction made at the brake valve but the control pressure will be trapped at a correspondingly lower pressure for each separate reduction which automatically takes care of the control pressure which is the regulating pressure. In other words, whenever the brake valve is moved to lap position the auxiliary feed valve is automatically set to open when brake pipe pressure is one pound below the pressure in chamber C and to close and remain closed when this differential is less than one pound.

If the valve handle were moved directly from release to lap there would be a high pressure trapped in chamber C and the control chamber and the supply valve would be held open. As soon as the handle is moved to service, running or holding position, the pressure will equalize with chamber D and the brake pipe and the supply valve will close.

In an emergency all air pressure is rapidly exhausted from the brake pipe, chamber D and chamber C, by way of ports $x$, $t$, and $h$, and exhaust cavity E in the rotary valve which now registers with the brake pipe, chamber D and chamber C. These pressures then flow to the atmosphere maintaining equilization of pressures in the control and equalizing chambers 40 and 39 of the auxiliary feed valve. The supply valve 30 remains closed, being held on its seat by spring 35 against main reservoir pressure, which is now in the feed valve pipe and supply chamber 26.

What is claimed is:

1. In an air brake system the combination with a feed valve pipe, a brake pipe, an automatic brake valve having a piston chamber in the seat portion thereof, of a supplemental chamber in said seat portion, a valved connection between said chambers for holding pressure in said supplemental chamber, an auxiliary feed valve having a control chamber in communication with the supplemental chamber, an equalizing chamber in communication with the brake pipe, a supply chamber in communication with the feed valve pipe, a diaphram separating the control and equalizing chambers, a spring controlled valve normally closing communication between the equalizing and supply chambers, and means coupled to the valve and actuated by the diaphragm under predetermined pressure in the control chamber, for opening the valve to release pressure from the supply chamber to the equalizing chamber.

2. In an air brake system the combination with a feed valve pipe, a brake pipe, an automatic brake valve having a piston chamber in the seat portion thereof, of a supplemental chamber in said seat portion, means for trapping leaking pressure in said supplemental chamber, an auxiliary feed valve having a control chamber in communication with the supplemental chamber, an equalizing chamber in communication with the brake pipe, a supply chamber in communication with the feed valve pipe, a diaphragm separating the control and equalizing chambers, a valve normally closing communication between the equalizing and supply chambers, means actuated by the diaphragm under predetermined pressure in the control chamber, for opening the valve to release pressure from the supply chamber to the equalizing chamber, and a valved emergency by-pass through the diaphragm adapted to open under excess pressure.

3. In an air brake system the combination with a feed valve pipe, a brake pipe, an automatic brake valve having a piston chamber in the seat portion thereof, a supplemental chamber in said seat portion, a check valve connection between said chambers, an auxiliary feed valve having a control chamber in communication with the supplemental chamber, an equalizing chamber in communication with the brake pipe, a supply chamber in communication with the feed valve pipe, means operated by changes in relative pressures in the control and equalizing chambers for positively opening and closing communication between the equalizing and supply chambers, and an emergency by-pass carried by said means.

4. An auxiliary feed valve for air brake systems including a casing having a control chamber for receiving leaking pressure, an equalizing chamber for receiving brake pipe pressure, a supply chamber for receiving feed pipe pressure, means operated by an increase of pressure in the control chamber for establishing communication between the supply and equalizing chambers, and a valved emergency by-pass carried by said means.

5. An auxiliary feed valve for air brake systems including a casing having a control chamber for receiving leaking pressure, an equalizing chamber for receiving brake pipe pressure, a supply chamber for receiving feed pipe pressure, and means operated by an increase of pressure in the control chamber for establishing communication between the supply and equalizing chambers, said means including a pressure actuated diaphragm between the control and equalizing chambers, a valve normally closing communication between the supply and equalizing chambers, a connection fixedly attached to the valve and diaphragm, and an adjustable resilient means for holding the valve to its seat.

In testimony that I claim the foregoing as my own, I have hereto affixed my signature.

ELBERT R. GREENLEE.